Figure 1:
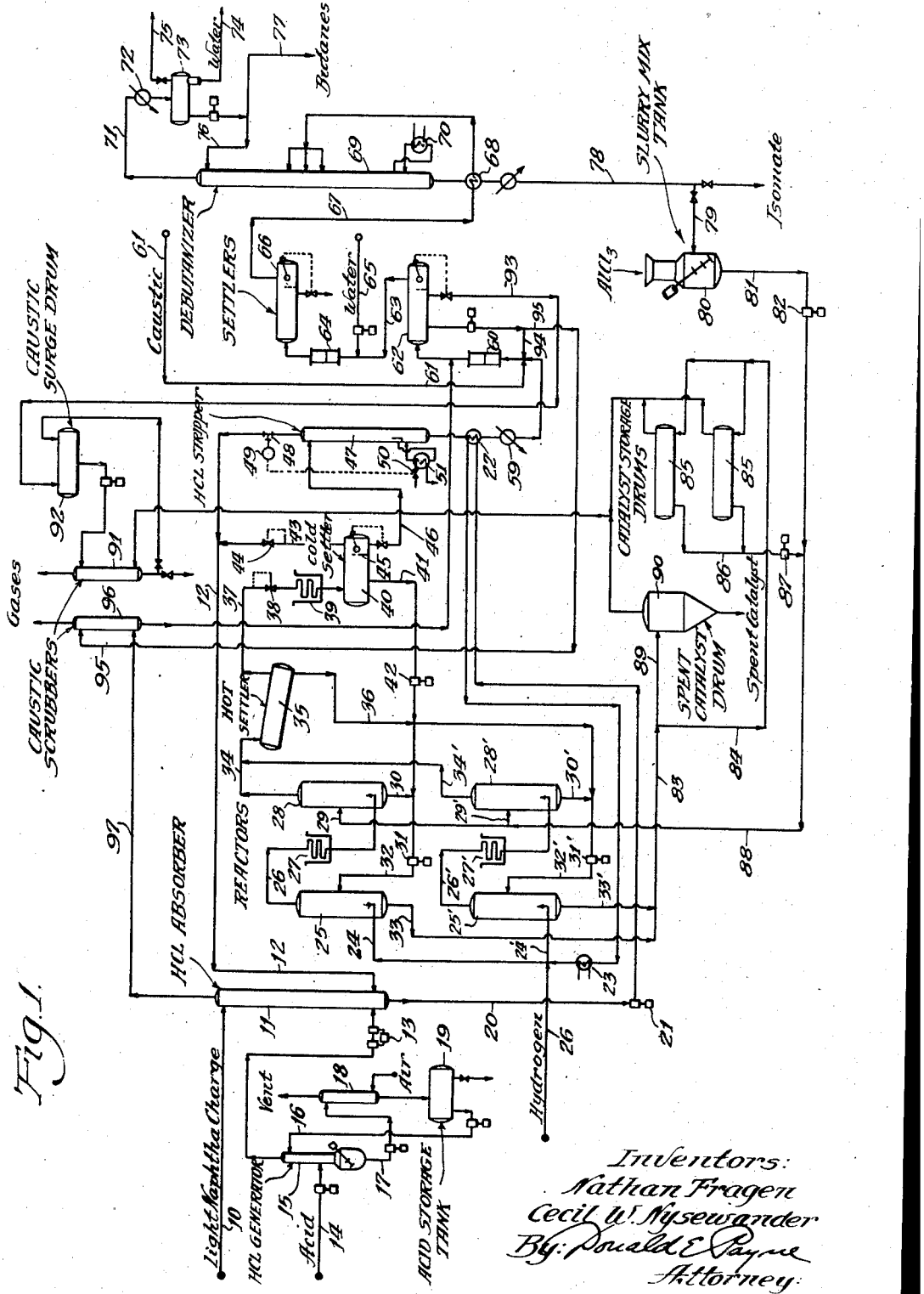

Jan. 14, 1947.  N. FRAGEN ET AL  2,414,371
CONTROLS FOR ISOMERIZATION SYSTEMS
Filed Sept. 4, 1942  2 Sheets-Sheet 2

Inventors:
Nathan Fragen
Cecil W. Nysewander
By Donald E. Payne
Attorney

Patented Jan. 14, 1947

2,414,371

UNITED STATES PATENT OFFICE 2,414,371

CONTROLS FOR ISOMERIZATION SYSTEMS

Nathan Fragen, Hammond, and Cecil W. Nysewander, Highland, Ind., assignors to Standard Oil Company, Chicago, Ill., a corporation of Indiana Application September 4, 1942, Serial No. 457,262

4 Claims. (Cl. 260—683.5)

This invention relates to improved methods and means for controlling the operation of a stripper or fractionator, and the invention pertains more particularly to the use of such controls in systems for isomerizing hydrocarbons by means of an aluminum chloride-hydrocarbon complex catalyst promoted by hydrogen chloride. While the invention is described in connection with an isomerization system, it is also applicable to other systems wherein similar problems may arise.

In the isomerization of pentanes and hexanes to branched-chain or more highly branched-chain isomers and in the treating of naphthenes admixed with such hydrocarbons as pentanes, hexanes, heptanes, etc., with an aluminum chloride-hydrocarbon complex catalyst for producing highly branched-chain paraffinic hydrocarbons, cyclo hexanes, etc., it is essential to employ relatively large amounts of hydrogen chloride. Only small amounts of hydrogen chloride are actually consumed in the conversions and it is, therefore, essential that the bulk of the hydrogen chloride be recovered from products leaving the system.

The stripping of hydrogen chloride from liquid isomerization products has presented a vexatious problem, partly because of the complications introduced by normally gaseous hydrocarbons resulting from the conversion step. Heretofore, the operation of stripping towers has been controlled by carefully regulating the temperatures at the top and bottom of the tower, the bottom temperature being high enough to insure the removal of all undesirable light components and the top temperature being low enough to prevent the loss of desired heavy components. Such regulation of tower top and tower bottom temperatures is ineffective for controlling the operation of the hydrogen chloride stripping tower in our isomerization system since, by the nature of the charge to the stripping towers combined with the nature of the stripping operation itself, a change in the heat input to the reboiler results in a large change in the amount of material vaporized and sent overhead without making an appreciable change in the tower bottom or top temperature. This is the case partly because a large percentage, for example 90%, of the total heat input to the base of the stripper is utilized in increasing sensible heat, the remaining 10% going into the latent heat of vaporization of the lighter hydrocarbons, hydrogen chloride, etc. Thus an increase in total heat input of 10% would amount to a 100% increase based on the increment that was vaporizing the lighter hydrocarbons and the result would mean an increase in overhead product of nearly 100%. The doubling of the relative small amount of material being vaporized from the bottoms would have only a minor effect on the bottom or top temperature. We have found that both the tower-top and tower-bottom temperatures are relatively insensitive to the amount of heat put into the tower, while the operation of the tower itself is extremely sensitive to the amount of heat input. The amount of recycled normally gaseous hydrocarbons leaving the top of the stripper may vary over a wide range with variations in the heat input to the tower even though there is very little change in tower temperatures. Thus the usual controls based on temperatures are ineffective for controlling the hydrogen chloride stripper and an object of our invention is to provide a new and improved method and means for controlling said stripper.

A further object of our invention is to increase the recovery of hydrogen chloride in an isomerization system and to effect such increased recovery at minimum expense. Since the overhead materials from the stripper are subsequently scrubbed by the fresh charge in an HCl absorbing tower and since conditions in the absorber are such as to efficiently recover HCl, substantially all of the $C_3$ and $C_4$ hydrocarbons in the stripper overhead will be absorbed in the fresh feed and thus recycled to the isomerization reactor. With regard to the ethane which must be eliminated from the system, its vapor pressure vs. temperature relationship is very close to that of HCl. However, it has been found that fewer mols of HCl are lost per mol of ethane when the ethane is removed from the system with the bottoms from the stripper than with the overhead from the absorber. Thus it may be readily seen that the stripping column must be very accurately controlled (1) to recover a maximum amount of HCl without recycling excessive amounts of $C_3$ and $C_4$ hydrocarbons and (2) to control the ratio of $C_2$ in the overhead and bottoms to give the minimum loss of HCl. Such accurate control has not been possible through the conventional means based upon tower top and bottom temperatures, and an object of our invention is to obtain such accurate control.

A further object of the invention is to maintain the amount of recycled normally gaseous hydrocarbons within closely defined narrow limits and to withdraw most of the ethane and any propane and butane produced or present in the feed with the liquid products from the bottom of the stripper thereby minimizing the amount of such hydrocarbons fed to the HCl absorber and subsequently recycled to the isomerization process. Other objects will be apparent as the detailed description of our invention proceeds.

In practicing our invention we operate our system continuously on a given charging stock under substantially constant operating conditions and with catalyst of substantially constant activity. The gases and products which continuously leave the conversion zone pass through a pressure reduction valve and cooler to a gas-liquid separation zone which is maintained at a predetermined temperature and pressure so that the liquids which leave this zone and enter the hydrogen chloride stripper are of substantially uniform composition and amount. They contain in solution a substantially uniform amount of hydrogen chloride and other dissolved gases. This hydrogen chloride solution of substantially constant composition is continuously introduced into a stripping tower at a substantially constant rate. To insure that a substantially constant amount of gases are taken overhead, the overhead gases are passed through a flow meter and the heat input to the stripping tower is controlled either manually or automatically in accordance with the gas flow as indicated by said flow meter. In other words the heat input to the stripping tower is controlled by the amount of gases leaving the top of the stripping tower instead of by the temperatures which may prevail at various points in said tower.

The control of the amount of heat introduced into the stripping tower may be effected by controlling the amount and/or temperature of a heating fluid circulated in heat exchange with the tower contents but is preferably effected by controlling the amount of steam introduced into the stripping tower reboiler and/or by controlling the amount of preheating to which the entering solution is subjected before entering the stripper. A part of the entering stream may be introduced near the top of the stripper and another part may enter at a lower point through a heat exchanger, the amount which is passed through the heat exchanger being controlled in order to maintain the desired constant volume of gases leaving the top of the stripper. The regulation of heat input through the reboiler may be an alternative or additional control but when employed as a sole control there is usually a greater time lag and a less uniform operation than when the heat input is regulated at a higher point in the tower.

It is impossible to remove hydrogen chloride from the stripper without at the same time removing considerable amounts of ethane along with propane and butane. Most of the ethane, propane and butane is absorbed along with the HCl in the absorbing tower by the incoming charging stock and is thus recycled through the conversion zone. This recycled stream should not be more than about 15% of the charging stock and in practicing our invention we regulate the heat input into the stripper so that the total liquid volume of $C_2$ to $C_4$ hydrocarbons which is thus recycled will be less than 10% by volume, usually in the general vicinity of 7% by volume of the total charging stock. Most of the $C_2$ and substantially all of the $C_3$ and $C_4$ hydrocarbons which are actually produced in the conversion step should be eliminated from the system in the final product fractionation instead of from the initial absorber if hydrogen chloride losses are to be maintained at a minimum and the caustic required for neutralization of gases and products is likewise to be held at a minimum. Each mol of ethane which leaves the top of the HCl absorber may carry with it about 6 mols of hydrogen chloride. On the other hand each mol of ethane withdrawn from the base of the stripper carries with it only about 1½ mols to 2 mols of hydrogen chloride. Thus if hydrogen chloride losses are to be maintained at a minimum the ethane which is produced in the system should be eliminated chiefly with the products leaving the base of the stripper, e. g. about 90% from the base of the stripper and about 10% from the top of the absorber.

Figure 2:
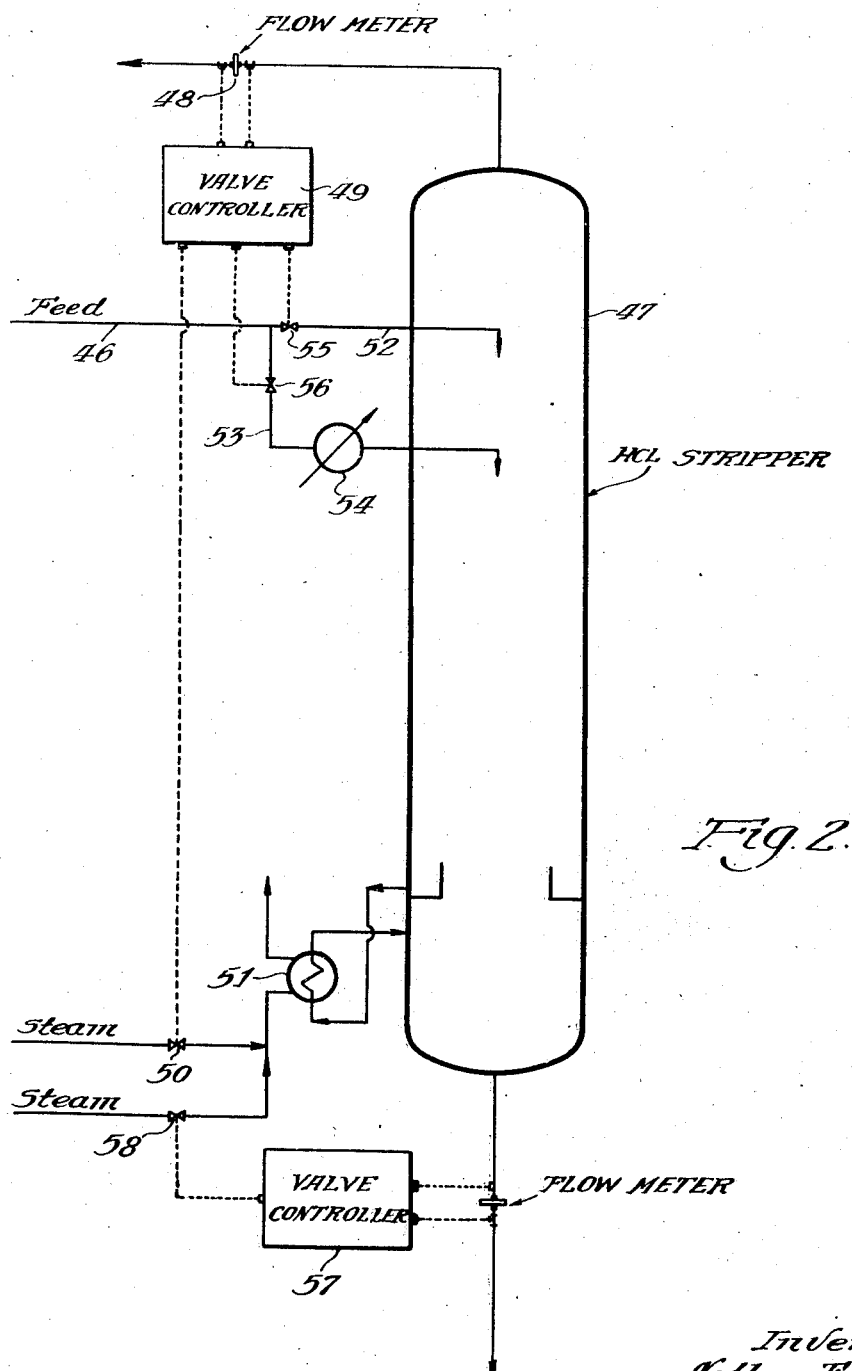

The invention will be more clearly understood from the following detailed description read in conjunction with the following drawings which form a part of the specification and in which Figure 1 is a schematic flow diagram of our improved isomerization system, and Figure 2 is a schematic flow diagram illustrating in more detail our improved method and means of controlling stripping tower operation.

Our invention will be described as applied to a 5000 barrels of fresh charge per day plant for converting a close cut light naphtha stream into a high octane number isomate. It should be understood, however, that this particular example is by way of illustration and not by way of limitation. Our invention is applicable to other isomerization systems and, in fact, any system wherein the fractionation or removal of light components from a uniform liquid stream cannot be adequately controlled by regulating the temperatures in the fractionating or stripping tower.

The charging stock in this particular example is a Mid-Continent light virgin naphtha boiling substantially within the range of about 110 to 160° F. with a 10% point of about 120° F. and a 90% point of about 155° F. said charging stock consisting chiefly of pentanes and hexanes (with the hexanes predominating) a lesser amount of naphthenes, and less than 3% of aromatics. This charging stock is introduced by line 10 to the top of absorber 11 at a pressure of about 285 pounds per square inch and at a temperature of about 90° F. A hydrogen chloride-containing gas stream (which will be hereinafter described) is introduced at the base of the absorber by line 12. Make-up hydrogen chloride is introduced at the base of the absorber by compressor 13. Make-up hydrogen chloride may be generated by introducing 22° Bé. muriatic acid through line 14 into the tower of generator 15 into which concentrated sulfuric acid (about 66° Bé.) is introduced through line 16. The spent sulfuric acid (about 60° Bé.) leaves the generator through line 17, is blown with air for removal of residual hydrogen chloride in tower 18 and is concentrated in system 19 for return to the hydrogen chloride generation system. About 3500 to 4000 pounds per day of anhydrous hydrogen chloride may thus be produced in generator 15 and introduced by compressor 13 into the base of absorber 11. Any other type of HCl generator may of course be used.

The charging stock with absorbed hydrogen chloride is removed from the bottom of the absorber by line 20 and pumped by pump 21 through heat exchanger 22 and heater 23 so that it may be introduced by line 24 into reactor 25 or by line 24' into reactor 25' at a temperature of approximately 300° F. and at a pressure of approximately 850 pounds per square inch. Relatively pure hydrogen at approximately this pressure is introduced into the system through line 26 into lines 24 or 24' or into reactors 25 or 25' at a point below the charging stock inlet. It is desirable that the hydrogen be free from carbon monoxide and other catalyst poisons. Such poisons may be removed from the incoming hydrogen by scrubbing it with spent catalyst complex leaving the system and hydrogen chloride may be recovered from spent catalyst in such a scrubbing step.

Reactors 25 and 25' may be towers about 5 or 6 feet in diameter by about 25 feet in height and during normal operation they are about ½ to ¾ full of a liquid aluminum chloride hydrocarbon complex. Initially this complex may be formed by contacting aluminum chloride with isooctane in the presence of hydrogen chloride or it may be formed by reaction of aluminum chloride on a part of the charging stock itself in the presence of hydrogen chloride. The introduced charging stock passes upwardly through the liquid complex column in a state of fine dispersion, the necessary agitation being provided by the introduced hydrogen which is preferably employed in amounts ranging from about 50 to 300, for example, about 180 cubic feet (measured at standard conditions) per barrel of charging stock. The space velocity through reactors 25 or 25' may be about .5 to 5 volumes of charging stock per hour per volume of complex.

Hydrocarbon liquids together with gases and vapors leave the top of tower 25 or 25' through lines 26 or 26' and coolers 27 or 27' and are then introduced at the lower part of reactor 28 or 28'. Sufficient heat is removed in cooler 27 or 27' so that the temperature in reactor 28 or 28' will be of the order of about 150 to 275° F., for example, about 250° F. Make-up aluminum chloride or catalyst material is introduced into reactors 28 or 28' through line 29 or 29'. Partially spent catalyst from reactors 28 or 28' is removed through lines 30 or 30' and passed by pump 31 or 31' and line 32 or 32' to reactor 25 or 25'. Spent catalyst is removed from reactor 25 or 25' through lines 33 or 33'. Usually we employ about 1 pound of make-up aluminum chloride for 30 gallons of charging stock treated and we regulate the flow of catalyst through the reactors accordingly. Our invention is not limited to any particular type of reactor flow and it should be understood that we may use a counter-current system, a concurrent system or any system whatsoever for effecting the isomerization conversion.

Hydrocarbon liquids together with gases and vapors leave the top of reactor 28 or 28' through lines 34 or 34' which lead to hot settler 35 which may be a horizontal or slightly inclined drum about 5 feet in diameter by about 20 feet in length. Settled catalyst is returned from the base of the settler through line 36 to lines 30 or 30'.

Liquid hydrocarbon gases and vapors leave the top of settler 35 through line 37, then pass through pressure reducing valve 38, then through cooler 39 and are introduced into cool settler 40 which may be a substantially horizontal chamber about 7 feet in diameter by about 30 feet long and which may be operated at a temperature of about 100° F. and a pressure of about 340 pounds per square inch. Separated or precipitated catalyst material is withdrawn by line 41 and returned by pump 42 to line 30 or 30'. Separated gases leave the settler through line 43 and pressure controlled valve 44 to line 12 for recycling to the base of absorber 11. Liquid hydrocarbon conversion products flow over baffle 45 and are withdrawn through line 46 to the upper part of hydrogen chloride stripper 47. This stripper may be operated at a pressure of about 290 pounds per square inch with a top temperature of approximately 140° F. and a bottom temperature of approximately 340° F. The operation of the stripper is not controlled, however, by regulating the top and bottom temperatures.

The gases which leave the top of the stripper pass through flow meter 48. Valve controller 49 operates in accordance with the amount of gas passing through flow meter 48 and controls the opening of valve 50 for regulating the amount of steam introduced through reboiler 51 at the base of the hydrogen chloride stripper tower. Thus if an unduly large amount of gas leaves the top of the tower, this fact will be indicated by meter 48, whereupon controller 49 will partially close valve 50 for decreasing the heat input into the stripper tower through reboiler 51. If too small a volume of gas leaves the top of the stripper, controller 49 will open valve 50 to increase the heat input to the stripper tower.

For the sake of simplicity we have limited Figure 1 to a showing of the reboiler heat input control but it should be understood that various other means of heat input control may be employed. Referring for example to Figure 2, the product stream from line 46 may be split, a part being introduced near the top of the stripper tower through line 52 and another part entering a lower point in the stripper through line 53 and heater 54. Valves 55 and 56 in lines 52 and 53 respectively may be automatically controlled by valve controller 49 in accordance with the volume or amount of gases passing through flow meter 48 so that the amount of gases leaving the top of the stripper is maintained substantially constant, the heat input to the tower in this case being regulated by regulating the amount of charge passed through heater 54. By regulation of the heat input to the tower at its upper portion we may avoid the time lag that occurs when the sole control is heat input to reboiler 51. A constant feed flow through exchanger 54 may of course be used and the heat input may be regulated in the same way as it is regulated in exchanger 51, i. e., by control of steam pressure of flow of heating medium.

Instead of varying the heat input to the tower by varying the heating of fluids entering the tower we may employ heat exchange coils in the tower itself or a heat exchange jacket around the tower and we may control the heat thus introduced into the tower by valve controller 49. Various modifications and alternative arrangements will be apparent from the above description to those skilled in the art.

While the operation of the hydrogen chloride stripper is to be controlled by regulating the heat input to the tower in the manner hereinabove described, we may operate the tower at substantially constant temperature while it is being started up and until the desired equilibrium conditions have been reached. In starting up, for example, the temperature at the top may be maintained at approximately 135 to 140° F. by the liquids entering the top of the tower or by the use of any other means. The temperature at the bottom of the tower may be maintained at approximately 335 to 340° F. during the starting up period by a conventional temperature controller.

The amount of heat input to the stripper may also be controlled in accordance with the amount of bottoms leaving the stripper since with constant feed rate and constant rate of overhead removal there must also be a constant rate of bottoms removal. Thus valve controller 57 may regulate the position of valve 58 in accordance with the rate of bottoms withdrawal since this is simply another method of regulating heat input in accordance with the amount of materials taken overhead. Control 57 may be used to insure a rough control of the bulk of the heat input and control 49 may be used on only a portion of the heating medium to obtain closer control.

In the specific example herein described the valve controller 49 is set to maintain a gas flow of approximately 1080 cubic feet per minute. This gas is recycled through line 12 along with gases leaving cool settler 40 through line 43. About 80 mols per hour of gas is returned through line 43 along with approximately 120 mols per hour of gas from the top of the stripper. The gas which is thus passed through line 12 will have approximately the following mol composition:

| | |
|---|---|
| Hydrogen | 23.3 |
| Inert | 2.3 |
| Methane | 11.4 |
| Hydrogen chloride | 37.3 |
| Ethane | 14.0 |
| Propane | 0.9 |
| Butane and heavier | 10.8 |
| Total | 100.0 |

The bulk of these gases heavier than methane and in fact about half of the methane itself is absorbed in incoming charging stock in absorber 11 so that the volume of liquids leaving the absorber is about 5–15% greater than the volume of liquids entering the absorber. Since this volume of liquids leaving the absorber tower 11 for practical purposes varies in accordance with the amount of gases passing through flow meter 48, we may vary the heat input into the hydrogen chloride stripper to maintain a liquid stream entering pump 21 about 5 to 15%, for example, about 10% greater than the liquid stream entering the absorber through line 10. In fact, this method of control serves very well for small scale operations but in commercial operations we prefer to employ the flow meter with associated controls as hereinabove described.

The liquids leaving the base of hydrogen chloride stripper 47 passes through heat exchanger 22 and cooler 59 to mixer 60 into which a caustic solution is introduced from line 61. The caustic solution is settled from the product in settler 62 and the neutralized product then passes through line 63 to mixer 64 wherein it is mixed with water introduced through line 65. Water is separated out in settler 66 and the washed product is then introduced through line 67 and heat exchanger 68 into debutanizer tower 69 which is provided with a reboiler 70 at its base. The butane and lighter hydrocarbons leave the top of debutanizer through line 71 and pass through cooler 72 to receiver 73 from which water may be trapped out and removed through line 74 and uncondensed gases may be vented through line 75. A portion of the butane stream may be introduced through line 76 to the top of the debutanizer to serve as reflux and the remainder may be withdrawn through line 77. The debutanized isomate is withdrawn from the base of the debutanizer through line 78. A part of this product may be introduced through line 79 to mixer 80 for a slurry of make-up aluminum chloride. This make-up aluminum chloride may be introduced through line 81 by pump 82 to lines 29 and 29'. The make-up aluminum chloride may, however, be made into a paste with a part of the complex and thus introduced into reactors 28 or 28'.

Complex from lines 33 and 33' may be withdrawn through lines 83 and 84 to storage drums 85 and later returned to the system through line 86 by means of pump 87 and line 88. If the catalyst is spent when withdrawn from the reactors it is introduced through line 89 to spent catalyst drum 90. Gases from storage drums 85 and spent drum 90 may be neutralized in scrubber 91 by caustic from surge drum 92, this caustic preferably being the spent caustic which is introduced by line 93 from the bottom of settler 62. Similarly, a portion of this spent caustic from settler 62 may be recycled to the settler through line 94 and another portion passed by line 95 to scrubber 96 for neutralizing the gases leaving the top of absorber 11 through line 97.

Under the conditions hereinabove set forth there will be about 6 mols of hydrogen chloride for every mol of ethane in gases discharged from the top of absorber 11 through line 97 for neutralization in scrubber 96. On the other hand, there is only about 1½ mols of hydrogen chloride for every mol of ethane withdrawn from the base of the stripper for neutralization in mixer 60 and settler 62. Thus by operating the system so that the ethane which is actually produced in the isomerization reaction is removed from the system with the liquid products rather than with the gases leaving the top of the absorber, we effect considerable savings in hydrogen chloride as well as in the amount of caustic required for neutralization.

When a hydrogen chloride stripper is controlled by regulating temperatures at the top and bottom thereof with the bottom temperature high enough to eliminate hydrogen chloride, the recycled gases are very likely to build up in the system to such an extent as to substantially displace the charging stock when operating to a fixed amount of reactor charge. By regulating the heat input into the stripper to maintain the recycled gas stream within critical limits so as to provide an increase of about 5 to 15%, e. g., about 10%, in the volume of liquids leaving the base of the absorber, we obtain maximum efficiency in the system as a whole and minimum losses of hydrogen chloride.

While we have described in detail a particular example of our invention it should be understood that the invention is not limited thereto and is not limited to the particular operating conditions or to the particular system described in connection therewith. In fact, many features of the invention are applicable to any system wherein a stripper or fractionating tower operates on a liquid of substantially constant composition and it is, therefore, desired to take a certain amount of material overhead from the tower in order to effect the desired fractionation.

We claim:

1. The method of continuously removing dissolved hydrogen chloride from a hydrocarbon stream of substantially constant composition containing dissolved hydrogen chloride along with ethane, gases lower boiling than ethane and gases higher boiling than ethane and of continuously recovering at least a part of the hydrogen chloride removed in a hydrocarbon stream, which method comprises continuously introducing said first named hydrocarbon stream at a substantially constant rate into a gas separation zone wherein a portion of the dissolved hydrogen chloride in said first named hydrocarbon stream is separated as hydrogen chloride vapor or gas along with ethane vapor or gas, gases lower boiling than ethane and gases higher boiling than ethane, continuously withdrawing a liquid stream from said separation zone of substantially constant composition and introducing said withdrawn liquid stream at a substantially constant rate into a stripping zone and effecting the introduction of at least a part of said liquid stream into said stripping zone at a point near the top thereof, maintaining a higher temperature at the base of said stripping zone than is maintained in the upper part thereof, supplying sufficient heat to said stripping zone for vaporizing dissolved hydrogen chloride, ethane and gases both higher and lower boiling than ethane, maintaining the temperature at the top of the stripping zone sufficiently low to effect condensation of most but not all of the hydrocarbons which are higher boiling than ethane, withdrawing hydrogen chloride vapor or gas along with a substantial proportion of the ethane vapor or gas, most of the gases lower boiling than ethane and a minor proportion of gases higher boiling than ethane as a gaseous stream from the top of the stripping zone at a substantially constant volume rate by regulating the amount of heat introduced into said zone in accordance with the volume rate of gaseous stream withdrawal, recovering at least a part of the hydrogen chloride vapor or gas removed from said first named hydrocarbon stream by contacting hydrogen chloride gas or vapor, ethane gas or vapor, gases lower boiling than ethane, and gases higher boiling than ethane in an absorption zone with a stream of low boiling paraffinic hydrocarbons under such conditions that a major part of the hydrogen chloride gas or vapor and higher boiling components are absorbed, and unabsorbed gases or vapors are vented at the top of the absorption zone, said unabsorbed gases including hydrogen chloride gas or vapor and ethane gas or vapor, continuously and simultaneously removing a liquid hydrocarbon stream containing ethane and hydrogen chloride from the base of said stripping zone, the portion of ethane removed from the base of said stripping zone being substantially in excess of that portion vented at the top of the absorption zone, and treating said withdrawn liquid to remove therefrom the hydrogen chloride contained therein.

2. The method of claim 1 which includes the steps of introducing at least a part of the liquid hydrocarbon stream of substantially constant composition withdrawn from said separation zone into the stripping zone at an intermediate point therein, heating the portion of the stream thus introduced at the intermediate point and introducing another part of the stream near the top of the stripping zone at a sufficiently low temperature to effect said low temperature maintenance in the top of said stripping zone.

3. The method of operating a process for the isomerization of low boiling isomerizable paraffinic hydrocarbons wherein a recycled gas containing hydrogen chloride, ethane, components lower boiling than ethane and hydrocarbon components higher boiling than ethane is passed through an absorption zone in contact with a liquid charging stock stream consisting essentially of said low boiling isomerizable paraffinic hydrocarbons under such conditions that most of the hydrogen chloride and hydrocarbon components higher boiling than ethane are absorbed in said stream, wherein the unabsorbed gases are vented from the top of the absorption zone and the charging stock stream from the base of the absorption zone is contacted with an aluminum chloride catalyst material under isomerization conditions, and wherein the liquid product from the isomerization step is of substantially constant composition and is passed at substantially constant rate through a stripping zone for removal of hydrogen chloride and other dissolved gases, which method comprises withdrawing a gasiform stream containing most of the hydrogen chloride originally contained in the liquid product stream and also containing substantial amounts of ethane, components lower boiling than ethane and hydrocarbon components higher boiling than ethane from the top of the stripping zone at a substantially constant volume rate by controlling the amount of heat introduced into the stripping zone, introducing said withdrawn gas together with added hydrogen chloride gas at a low point in said absorption zone at such a rate that the volume of liquid leaving the absorption zone is at least about 5% greater than the volume of liquid introduced thereto but is not more than 15% greater than the volume of liquid introduced thereto, and removing residual hydrogen chloride from the product stream leaving the base of the stripping zone by treating said stream with an alkaline reagent.

4. The method of operating an isomerization process wherein a gas stream containing hydrogen chloride, ethane, components lower boiling than ethane, and hydrocarbon components higher boiling than ethane is contacted in an absorption zone with a liquid charging stock stream consisting essentially of low boiling isomerizable paraffinic hydrocarbons, wherein unabsorbed gases are vented from the top of the absorption zone and the charging stock stream from the base of the absorption zone which charging stock stream contains dissolved hydrogen chloride, is contacted with an aluminum chloride isomerization catalyst under isomerization conditions in an isomerization step whereby a small amount of ethane is produced, and wherein liquid product of substantially uniform composition is passed from said isomerization step at a substantially constant rate through a stripping zone for the removal of hydrogen chloride and hydrocarbon gases lighter than butane, said hydrogen chloride and hydrocarbon gases lighter than butane together with added hydrogen chloride gas constituting said first-named gas stream, which method comprises withdrawing gases and vapors from the top of the stripping zone at a substantially constant volume rate by regulating the amount of heat introduced into the stripping zone, passing the removed gases and vapors together with said added hydrogen chloride gas from the top of the stripping zone to a low point in the absorption zone, neutralizing liquid products removed from the base of the stripping zone for removing residual hydrogen chloride and operating said stripping zone under such conditions of temperature, pressure and heat input that the bulk of the ethane produced in the isomerization step is removed from the base of the stripping zone rather than from the top of the absorption zone.

NATHAN FRAGEN.
CECIL W. NYSEWANDER.